United States Patent
Yamamoto et al.

(10) Patent No.: US 12,406,096 B2
(45) Date of Patent: Sep. 2, 2025

(54) UTILIZATION MANAGEMENT DEVICE, UTILIZATION MANAGEMENT METHOD, AND PROGRAM

(71) Applicant: BITKEY INC., Tokyo (JP)

(72) Inventors: Hiroshi Yamamoto, Tokyo (JP); Yuki Ejiri, Tokyo (JP)

(73) Assignee: BITKEY INC., Tokyo (JP)

( * ) Notice: Subject to any disclaimer, the term of this patent is extended or adjusted under 35 U.S.C. 154(b) by 150 days.

(21) Appl. No.: 17/800,840

(22) PCT Filed: Dec. 1, 2020

(86) PCT No.: PCT/JP2020/044757
§ 371 (c)(1),
(2) Date: Aug. 18, 2022

(87) PCT Pub. No.: WO2021/166364
PCT Pub. Date: Aug. 26, 2021

(65) Prior Publication Data
US 2023/0082618 A1    Mar. 16, 2023

(30) Foreign Application Priority Data
Feb. 21, 2020    (JP) .................. 2020-028868

(51) Int. Cl.
*G06F 21/64*    (2013.01)
*G06F 21/32*    (2013.01)
(Continued)

(52) U.S. Cl.
CPC .......... *G06F 21/64* (2013.01); *G06F 21/32* (2013.01); *G06Q 20/045* (2013.01);
(Continued)

(58) Field of Classification Search
None
See application file for complete search history.

(56) References Cited

U.S. PATENT DOCUMENTS

2001/0018660 A1*  8/2001  Sehr .................... G07F 7/02
                                                    705/41
2016/0196509 A1*  7/2016  Whitaker ............ G06F 16/50
                                                    705/5
(Continued)

FOREIGN PATENT DOCUMENTS

JP    2001-148037 A    5/2001
JP    2003-132435       5/2003
(Continued)

OTHER PUBLICATIONS

International Search Report dated Mar. 2, 2021, for PCT/JP2020/044757, 5 pp., including English translation.
(Continued)

*Primary Examiner* — Kaveh Abrishamkar
(74) *Attorney, Agent, or Firm* — Nixon & Vanderhye P.C.

(57) ABSTRACT

An object of the present invention is to perform offline management of use of usage target object by a user having a ticket, while reducing risk on security. A use permit that includes transaction information specifying usage conditions for the user to use the usage target object, is added as a two-dimensional code printed on a ticket. A utilization management device takes an image of the two-dimensional code added to the ticket to read the use permit from the image. Then, the utilization management device verifies a signature added to the use permit by using a public key provided in advance by a provider of the usage target object. If verification is established, the utilization management device refers transaction information included in the use permit to permit for user to use of the usage target object when usage condition specified by the transaction information are satisfied.

16 Claims, 5 Drawing Sheets

(51) Int. Cl.
*G06Q 20/04* (2012.01)
*G06Q 20/38* (2012.01)
*G06Q 20/40* (2012.01)

(52) U.S. Cl.
CPC ..... *G06Q 20/3825* (2013.01); *G06Q 20/3829* (2013.01); *G06Q 20/40145* (2013.01); *G06Q 2220/00* (2013.01)

(56) References Cited

U.S. PATENT DOCUMENTS

| | | | | |
|---|---|---|---|---|
| 2017/0286873 | A1* | 10/2017 | Grimault | G06Q 20/3229 |
| 2019/0245684 | A1* | 8/2019 | Shen | G06K 19/10 |
| 2020/0382504 | A1* | 12/2020 | dos Santos Silva | H04L 63/10 |
| 2020/0410266 | A1* | 12/2020 | Luo | G06V 40/172 |
| 2021/0119807 | A1* | 4/2021 | Chen | H04L 9/3242 |

FOREIGN PATENT DOCUMENTS

| | | |
|---|---|---|
| JP | 2005-122268 | 5/2005 |
| JP | 2017-117301 | 6/2017 |

OTHER PUBLICATIONS

Written Opinion of the ISA dated Mar. 2, 2021, for PCT/JP2020/044757, 3 pp.
Office Action dated Feb. 25, 2025 issued in Japanese Application No. 2020-028868 with machine English translation (26 pages).
Office Action dated Mar. 5, 2024 issued in Japanese Application No. 2020-028868 with machine English translation (9 pages).
Office Action dated May 21, 2024 issued in Japanese Application No. 2020-028868 with machine English translation (9 pages).

\* cited by examiner

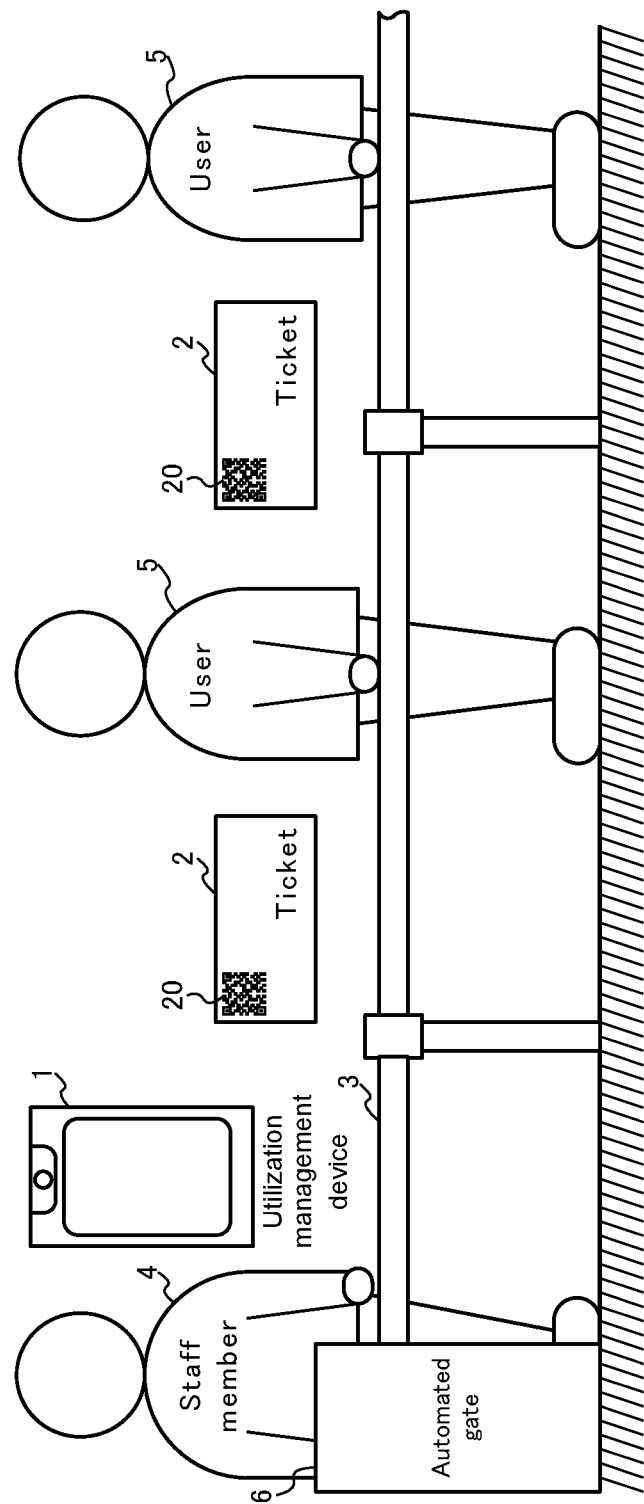

UTILIZATION MANAGEMENT DEVICE, UTILIZATION MANAGEMENT METHOD, AND PROGRAM

This application is the U.S. national phase of International Application No. PCT/JP2020/044757 filed Dec. 1, 2020, which designated the U.S. and claims priority to JP 2020-028868 filed Feb. 21, 2020, the entire contents of each of which are hereby incorporated by reference.

TECHNICAL FIELD

The present invention relates to a utilization management technique for managing use of a usage target object by means of a ticket, such as managing entrance into a hall or a place in which various types of events such as concert, live show, exhibition, exposition, and the like are held, or managing boarding of various types of vehicles such as train, airplane, ship, taxi, and the like.

BACKGROUND ART

The Patent Literature 1 discloses a system in which, by only carrying a room key, one can use various services, including locking and unlocking of a room in a facility such as a corporate facility, a hospital, a game hall, a public facility, or the like. This system comprises: room keys each having a readable/writable Radio Frequency Identification (RFID) tag that stores information such as a room number, a password, customer information, or the like; RFID readers that are installed at various places of the facility for reading and writing information from and into the RFID tag of a room key; a database that stores information on rooms and equipment in the facility; and a server that is connected to the RFID readers and the database via a network and performs management of the rooms and the equipment in the facility. For example, an RFID reader installed at a door of a room or in the inside of a room reads information stored in the RFID tag of the room key and sends the information to the server. On receiving the information, the server compares the room number included in the information received from the RFID reader with the room number of the room where the RFID reader is installed, so as to lock or unlock the room in question.

CITATION LIST

Patent Literature

Patent Literature 1: Japanese Unexamined Patent Application Laid-Open No. 2003-132435

SUMMARY OF INVENTION

Technical Problem

The system described in the Patent Literature 1, however, premises that a room key is lent out and returned at a reception desk of a facility such as a corporate facility, a hospital, a game hall, a public facility, or the like, and does not suppose that a usage target object is used by a user who owns a ticket such as an entrance ticket, a token, a boarding ticket, or the like.

Further, in the system of the Patent Literature 1, the RFID readers installed at various places of a facility read information stored in an RFID tag of a room key, and sends the information to the server via the network. Thus, the system premises that the RFID readers are online units, and does not suppose application to offline cases.

The present invention has been made taking the above situation into consideration. An object of the invention is to perform offline management of use of a usage target object by a user having a ticket, such as management of entrance into a hall or a place in which various events such as concert, live show, exhibition, exposition, and the like are held or management of boarding of vehicles such as train, airplane, ship, taxi, and the like, while reducing risk on security.

Solution to Problem

To solve the above problems, the present invention provides a utilization management device that manages user's use of a usage target object by means of a ticket to which a use permit that includes transaction information (such as usage target object, usage period, usage place, usage section, and the like) specifying usage conditions of user's use of the usage object is added as a code (for example, a visible two-dimensional code). Here, the ticket may be a sheet-like medium made of paper, plastic, or the like, on which the code has been printed, or image data including an image that expresses the code and is displayed on a display panel of a mobile terminal such as a smartphone.

First, the utilization management device reads the use permit from the code added to the ticket held by the user. Next, by using a public key provided in advance from a provider of the usage target object, the utilization management device verifies a signature that is generated by a secret key of the provider of the usage target object and added to the use permit. When the verification of the signature is established, the utilization management device acquires the transaction information included in the use permit. Then, the utilization management device refers to the acquired transaction information, and when the usage conditions specified in the transaction information are satisfied, the utilization management device permits user's use of the usage target object.

Here, user's biometric information (for example, face recognition information) may be added as a code together with the use permit to the ticket. In this case, first, biometric information is acquired from the user, and the use permit and biometric information are read from the code added to the ticket. Then, using the biometric information acquired from the user and the biometric information read from the code, biometric authentication of the user is performed. When the biometric authentication of the user is established, then the signature added to the use permit is verified.

For example, the present invention provides a utilization management device that manages user's use of a usage target object by means of a ticket issued to a user, wherein:
a use permit that includes transaction information specifying usage conditions for the user to use the usage target object, is added as a code to the ticket;
the utilization management device comprises:
a hole data storing means that stores hole data including a public key required for verifying the use permit;
a code reading means that reads the use permit from the code added to the ticket;
a signature verifying means that verifies a signature added to the use permit read by the code reading means, by using the public key included in the hole data stored in the hole data storing means; and
a usage condition judging means that refers to the transaction information included in the use permit read by the code reading means to judge whether the usage conditions specified in the transaction information are satisfied or not, when the verification of the signature by the signature verifying means is established.

Advantageous Effects of Invention

In the present invention, by verifying the signature of the use permit read from the code added to the ticket by using the public key included in the hole data stored in advance, it is possible to prevent falsification of the use permit and to verify offline the validity of the provider of the usage target object. Further, the usage conditions specified in the transaction information included in the use permit are judged to be satisfied or not. Therefore, it is possible to reject use of the usage target object by the user when the usage conditions are not satisfied even if the validity of the provider of the usage target object is established, and accordingly it is not needed to make the user return the use permit.

Thus, according to the present invention, it is possible to perform offline management of use of a usage target object by a user who owns a ticket, while reducing security risks, such as for example entrance management in various types of events such as concert, live show, exhibition, exposition, and the like and management of boarding of various types of vehicles such as train, airplane, ship, taxi, and the like.

BRIEF DESCRIPTION OF DRAWINGS

FIG. 5 is a schematic configuration diagram showing a variant of the utilization management system according to the one embodiment of the present invention.

DESCRIPTION OF EMBODIMENTS

Figure 1:
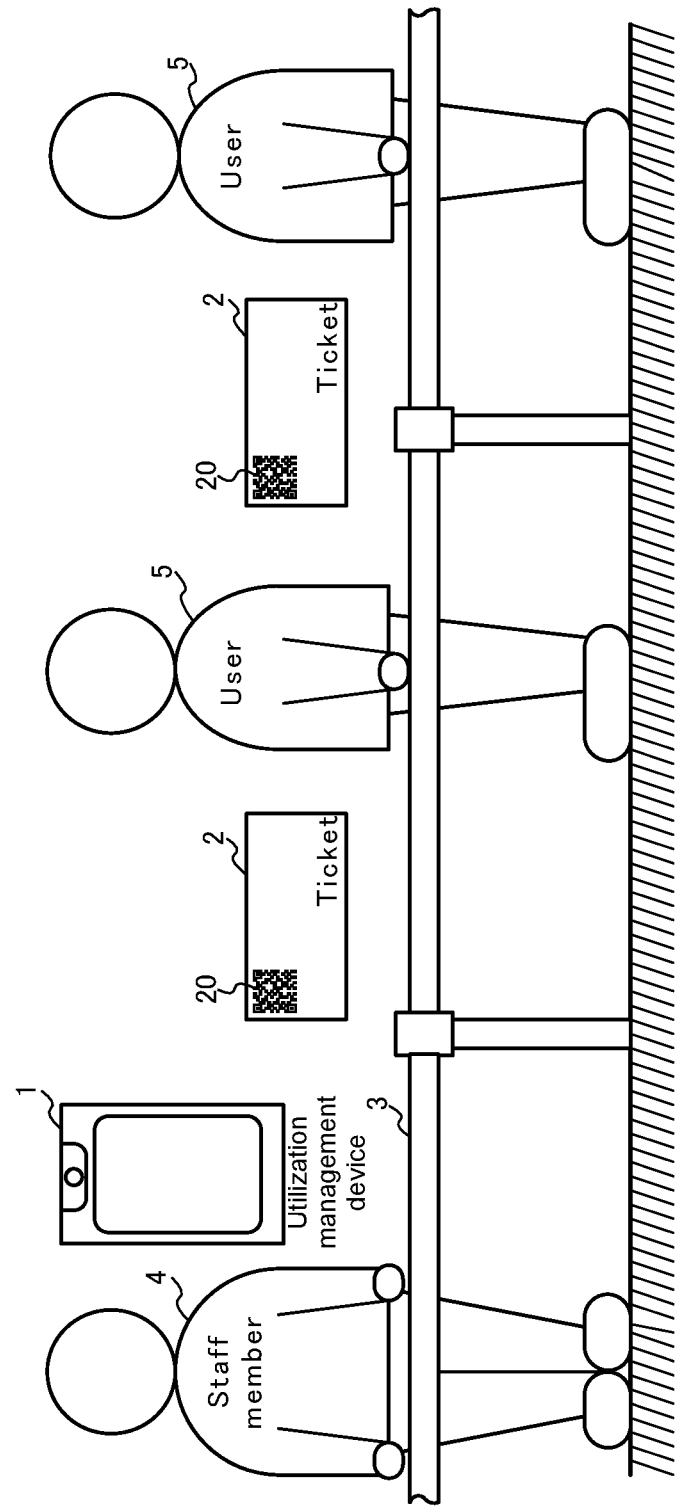
FIG. 1 is a schematic configuration diagram showing a utilization management system according to one embodiment of the present invention.

In the following, one embodiment of the present invention will be described referring to the drawings. The following description takes a concert providing service as one example of a usage target object.

FIG. 1 is a schematic configuration diagram showing a utilization management system according to the present embodiment.

As shown in the figure, the utilization management system of the present embodiment comprises: a utilization management device 1 held by a staff member 4 positioned at an entrance (not shown) of a hall in which a concert providing service as a usage target object is provided; and tickets 2 held by respective users (visitors to use the concert providing service) who wait to enter the hall standing in line on a simply-prepared passage 3 leading to the entrance of the hall.

Each ticket 2 is, for example, a sheet-like medium made of paper, plastic, or the like, and has a two-dimensional code 20 printed on at least one side of the ticket. The two-dimensional code 20 expresses a use permit and face recognition information of the user 5. The use permit includes transaction information that specifies usage conditions (such as the name of the concert as the usage target object, the name of the concert hall as the place for the use, the event date as the period for use, and the like) of the usage target object, imposed on the user 5, i.e., the owner of the ticket 2. The use permit has a signature generated by using a secret key of the concert host or the concert hall administrator, as the provider of the usage target object.

The utilization management device 1 is a camera-equipped mobile terminal such as a smartphone, a tablet Personal Computer (PC), or the like. By using the two-dimensional code 20 printed on a ticket 2 issued to the user 5, the utilization management device 1 judges whether the user 5 should be permitted to use the usage target object (i.e., should be permitted to view the concert) or not, to notify the staff member 4 of the result of the judgment.

Figure 2:
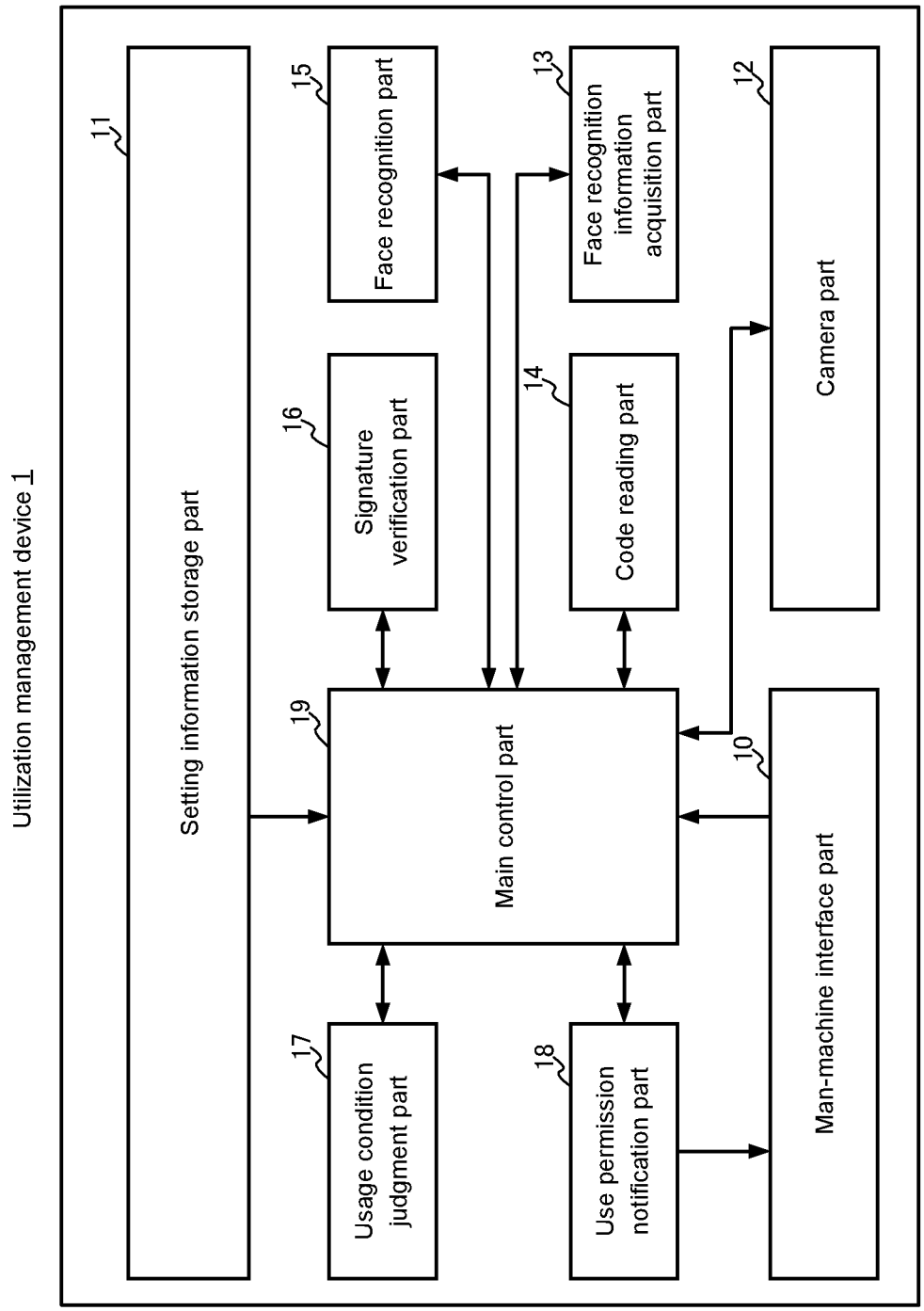
FIG. 2 is a schematic functional configuration diagram showing a utilization management device 1.

FIG. 2 is a schematic functional configuration diagram showing the utilization management device 1.

As shown in the figure, the utilization management device 1 comprises a man-machine interface part 10, a setting information storage part 11, a camera part 12, a face recognition information acquisition part 13, a code reading part 14, a face recognition part 15, a signature verification part 16, a usage condition judgment part 17, a use permission notification part 18, and a main control part 19.

The man-machine interface part 10 is an interface for displaying information to an operator (staff member 4) and for receiving various operations from the operator, and comprises, for example, a touch panel.

The setting information storage part 11 stores setting information that includes hole data required for verification of the use permit and usage conditions (such as concert name, concert hall name, event date, and the like) of the usage target object. Here, the hole data is provided in advance from a concert host or a concert hall administrator, as the provider of the usage target object, and includes a public key that pairs with a secret key of the provider.

The camera part 12 takes images of a face of the user 5 and the two-dimensional code 20 printed on the ticket 2.

The face recognition information acquisition part 13 extracts face recognition information (feature value) from the image data of the face of the user 5 taken by the camera part 12.

The code reading part 14 reads the use permit and the face recognition information from the image data of the two-dimensional code 20 taken by the camera part 12.

The face recognition part 15 performs face recognition of the user 5 by using the face recognition information extracted by the face recognition information acquisition part 13 from the image data of the face of the user 5 and the face recognition information read by the code reading part 14 from the image data of the two-dimensional code 20. In detail, the face recognition part 15 analyzes the degree of matching of the face recognition information extracted from the image data of the face of the user 5 with the face recognition information read from the image data of the two-dimensional code 20, to judge that the face recognition is established when the degree of matching is more than or equal to a prescribed value and is failed when less than the prescribed value.

The signature verification part 16 verifies a signature added to the use permit read from the image data of the two-dimensional code 20, by using the public key included in the hole data stored in the setting information storage part 11. In detail, the signature verification part 16 decrypts the signature by using the public key, to judge that the verification of the signature is established when the decryption result coincides with a message digest (hash value) generated from the use permit or a part of the use permit and is failed when the decryption result does not coincide with the message digest.

The usage condition judgment part 17 refers to the transaction information included in the use permit read from the image data of the two-dimensional code 20, to judge whether the usage conditions specified in the transaction information satisfy the usage conditions of the usage target object included in the setting information stored in the setting information storage part 11.

The use permission notification part 18 outputs permission or rejection of use of the usage target object (viewing of the concert) by the user 5 who owns the ticket 2 to the man-machine interface part 10.

The main control part 19 controls the above-mentioned parts 10-18 of the utilization management device 1 in an integrated manner.

The schematic functional configuration of the utilization management device 1 shown in FIG. 2 is implemented in a camera-equipped mobile terminal such as a smartphone, a tablet PC, or the like, comprising a Central Processing Unit (CPU), a memory, an auxiliary storage such as a flash memory, and a camera, by the CPU loading a prescribed program from the auxiliary storage into the memory to execute the program. The schematic functional configuration of the utilization management device 1 shown in FIG. 2 may be implemented by hardware, i.e., by using an integrated logic IC such as an Application Specific Integrated Circuit (ASIC), a Field Programmable Gate Array (FPGA), or the like, or may be implemented by software on a computer such as a Digital Signal Processor (DSP).

Figure 3:
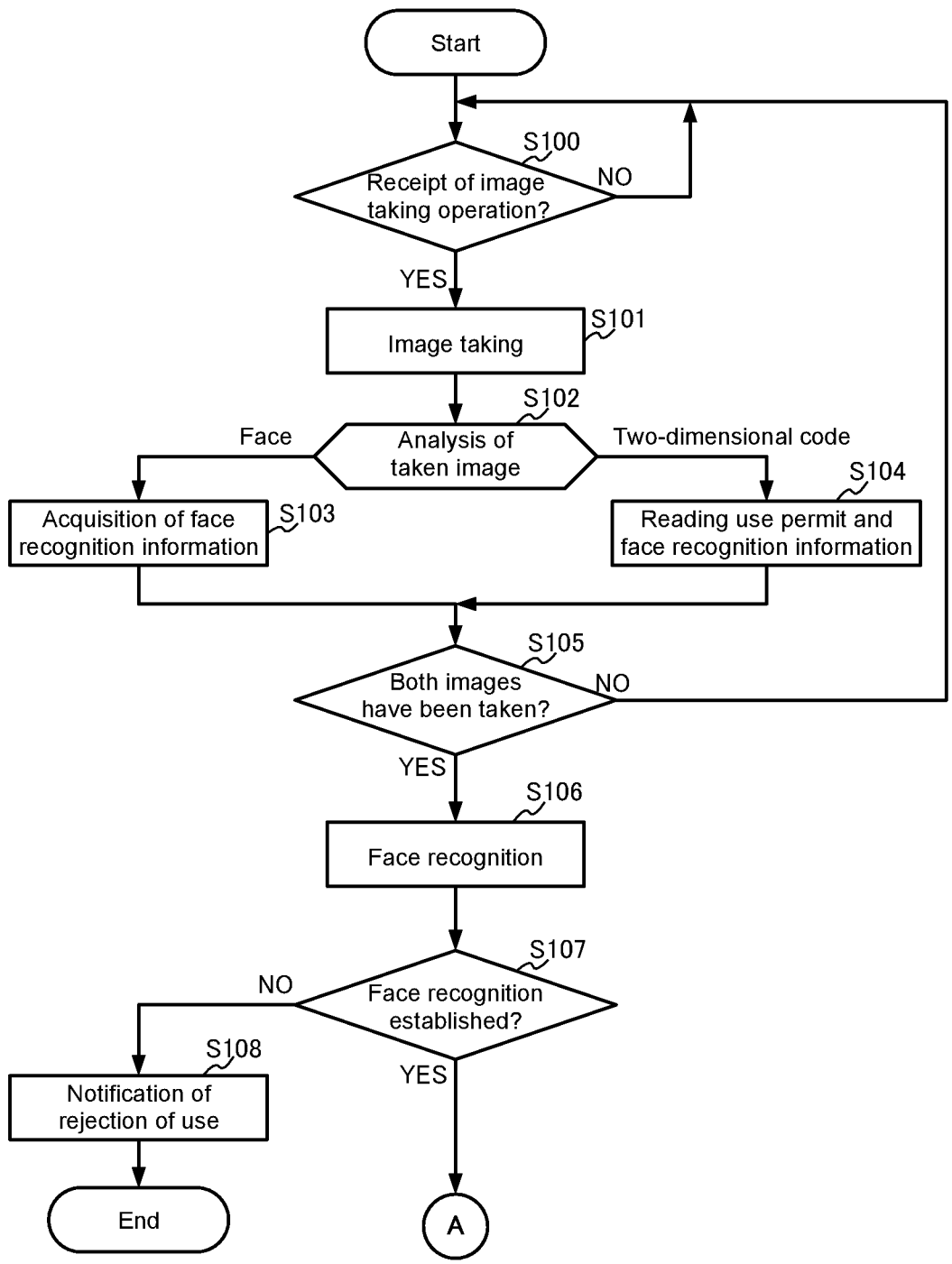
FIG. 3 is a flowchart for explaining operation of the utilization management device 1.
Figure 4:
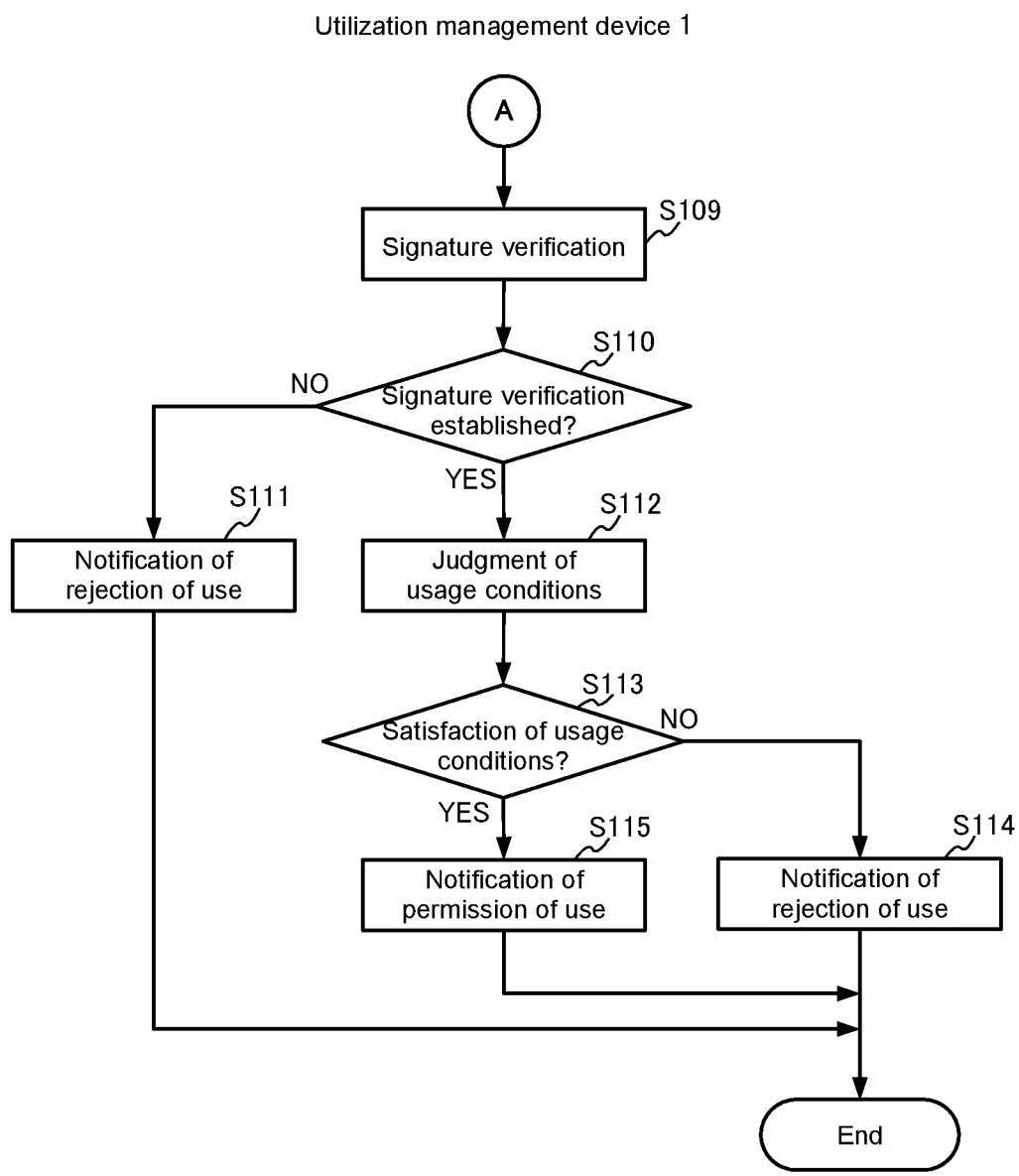
FIG. 4 is a flowchart for explaining operation of the utilization management device 1, following the flow of FIG. 3.

FIGS. 3 and 4 are flowcharts for explaining operation of the utilization management device 1.

When the main control part 19 receives an image taking operation from the staff member 4 through the man-machine interface part 10 (YES in S100), the main control part 19 instructs the camera part 12 to take an image. In response, the camera part 12 takes an image of a subject whose image is to be taken to deliver the image data to the main control part 19 (S101).

The main control part 19 analyzes the image data received from the camera part 12 (S102). In the case where a human face is included in the image of the subject ("Face" in S102), the main control part 19 delivers the image data as the image data of the face of the user 5 to the face recognition information acquisition part 13. In response, the face recognition information acquisition part 13 acquires face recognition information (feature value) of the user 5 from the face image included in the image data received from the main control part 19 to deliver the face recognition information to the main control part 19 (S103).

On the other hand, in the case where the two-dimensional code 20 printed on the ticket 2 is included in the subject's image data received from the camera part 12 ("Two-dimensional code" in S102), the main control part 19 delivers the image data as the image data of the two-dimensional code of the ticket 2 owned by the user 5 to the code reading part 14. In response, the code reading part 14 reads the use permit and the face recognition information expressed by the two-dimensional code included in the image data received from the main control part 19 to deliver the use permit and the face recognition information to the main control part 19 (S104).

Next, in the case where images of both the face of the user 5 and the two-dimensional code 20 printed on the ticket 2 have been taken by the camera part 12 (YES in S105), the main control part 19 proceeds to S106, and otherwise (NO in S105) returns to S100.

In S106, the main control part 19 delivers the face recognition information acquired by the face recognition information acquisition part 13 and the face recognition information read by the code reading part 14 to the face recognition part 15. In response, the face recognition part 15 performs face recognition of the user 5 by analyzing the degree of matching of the face recognition information acquired by the face recognition information acquisition part 13 with the face recognition information read by the code reading part 14 (S106). Then, the face recognition part 15 notifies the main control part 19 of the authentication result of the face recognition.

In the case where the authentication result of the face recognition notified from the face recognition information acquisition part 13 is "face recognition failed" (NO in S107), the main control part 19 notifies the use permission notification part 18 of the authentication result "face recognition failed" of the face recognition. In response, the use permission notification part 18 outputs a message indicating that use of the usage target object (viewing of the concert) is rejected, together with the reason (face recognition failed) of the rejection, to the man-machine interface part 10 (S108).

On the other hand, in the case where the authentication result of the face recognition notified from the face recognition information acquisition part 13 is "face recognition established" (YES in S107), the main control part 19 delivers the use permit acquired by the code reading part 14 and the public key (the public key of the concert host or the concert hall administrator as the provider of the usage target object) included in the hole data stored in the setting information storage part 11 to the signature verification part 16. In response, the signature verification part 16 verifies the signature added to the use permit read by the code reading part 14, by using the public key included in the hole data (S109). Then, the signature verification part 16 notifies the main control part 19 of the result of the signature verification.

Next, in the case where the result of the signature verification notified from the signature verification part 16 is "signature verification failed" (NO in S110), the main control part 19 notifies the use permission notification part 18 of the verification result of the signature verification, i.e., "signature verification failed". In response, the use permission notification part 18 outputs a message indicating that use of the usage target object (viewing of the concert) is rejected, together with the reason (signature verification failed) of the rejection, to the man-machine interface part 10 (S111).

On the other hand, in the case where the result of the signature verification notified from the signature verification part 16 is "signature verification established" (YES in S110), the main control part 19 delivers the use permit acquired by the code reading part 14 and the usage conditions of the usage target object included in the setting information stored in the setting information storage part 11 to the usage condition judgment part 17. In response, the usage condition judgment part 17 judges whether the usage conditions specified in the transaction information included in the use permit acquired by the code reading part 14 satisfy the usage conditions of the usage target object included in the setting information stored in the setting information storage part 11 (S112). Then, the usage condition judgment part 17 notifies the main control part 19 of the result of the judgment of the usage conditions.

In the case where the result of the judgment of the usage conditions notified from the usage condition judgment part 17 is "unsatisfied" (NO in S113), the main control part 19 notifies the use permission notification part 18 of the result of the judgment of the usage conditions "unsatisfied". In response, the use permission notification part 18 outputs a message indicating that use of the usage target object (viewing of the concert) is rejected, together with the reason (unsatisfied usage conditions), to the man-machine interface part 10 (S114).

On the other hand, in the case where the result of the judgment of the usage conditions notified from the usage condition judgment part 17 is "satisfied" (YES in S113), the main control part 19 notifies the use permission notification part 18 of the result of the judgment of the usage conditions, "satisfied". In response, the use permission notification part 18 outputs a message indicating that use of the object (viewing of the concert) is permitted, to the man-machine interface part 10 (S115).

Hereinabove, one embodiment of the present invention has been described.

In the present embodiment, the utilization management device 1 performs the face recognition of the user 5 by using the face recognition information acquired from the user 5 and the face recognition information read from the two-dimensional code 20 printed on the ticket 2. Accordingly, it is possible to verify offline the validity as the ticket owner of the user 5 who owns the ticket 2. Further, by using the public key included in the hole data stored previously, the utilization management device 1 verifies the signature added to the use permit read from the two-dimensional code 20 printed on the ticket 2. Thereby it is possible to prevent falsification of the use permit and to verify offline the validity of the provider of the usage target object who assures the user 5 of the right to use the object by means of the ticket 2. In addition, the utilization management device 1 judges whether the usage conditions specified in the transaction information included in the use permit satisfy the usage conditions included in the setting information stored in advance with respect to the usage target object. Thus, in the case where the usage conditions specified in the transaction information are not satisfied even if both the validity of the user 5 who owns the ticket 2 and the validity of the provider of the usage target object are verified, the staff member 4 is notified of unsatisfactoriness of the conditions, and therefore the staff member 4 can reject use of the usage target object by the user 5. Accordingly, it is not necessary to get the use permit back from the user 5.

Thus, according to the present embodiment, it is possible to realize offline entrance management of a concert by employing a ticket 2 issued to a user 5, while reducing security risks.

Further, in the present embodiment, the utilization management device 1 is provided with the camera part 12. The utilization management device 1 acquires face recognition information of the user 5 from the image data of the face of the user 5 taken by the camera part 12, and reads the use permit and the face recognition information from the image data of the two-dimensional code 20 of the ticket 2 taken by the camera part 12. Thus, according to the present embodiment, a camera-equipped mobile terminal such as a smartphone, a tablet PC, or the like can be used as the utilization management device 1.

The present invention is not limited to the above-described embodiment, and can be varied variously within the scope of the invention.

For example, as shown in FIG. 5, it is possible to place an automated gate 6 at the entrance (not shown) of a hall where a concert is held. The automated gate 6 can communicate with the utilization management device 1 by Near Field Communication such as IrDA, Bluetooth (registered trademark), or the like. Further, in S115 of FIG. 4, the utilization management device 1 sends a gate opening instruction to the automated gate 6 and, in response, the automated gate 6 in a closed or locked state is released (i.e., opened or unlocked) for a prescribed time.

Further, in the above embodiment, the utilization management device 1 may comprise a plurality of devices. For example, the utilization management device 1 comprises a mobile terminal such as a smartphone, a tablet PC, or the like and an information-processing device such as a laptop computer, a desktop computer, or the like. The mobile terminal performs S100-S108 (See FIG. 3). In the case where the face recognition is established in S107 (YES in S107), the mobile terminal sends the use permit read from the two-dimensional code 20 printed on the ticket 2 to the information-processing device. The information processing device performs S109-S113 (See FIG. 4), and sends the result of the judgment of the usage conditions to the mobile terminal, so that the mobile terminal outputs a message corresponding to the result of the judgment of the usage conditions in S114 or S115.

Further, in the above embodiment, the validity of the user 5 who owns the ticket 2 is verified by using the face recognition information acquired from the image data of the face of the user 5 and the face recognition information read from the two-dimensional code 20 printed on the ticket 2. The present invention, however, is not limited to this. The validity of a user 5 who owns a ticket 2 may be verified by using biometric information read from the user 5 and biometric information read from the two-dimensional code 20 printed on the ticket 2. For example, feature value of a face part (such as a nose or a lip) may be used as biometric information. Further, a vein authentication sensor may be connected to the utilization management device 1 in order to verify the validity of a user 5 who owns a ticket 2 by using vein authentication information acquired from the user 5 via the vein authentication sensor and vein authentication information read from the two-dimensional code 20 printed on the ticket 2.

Further, a signature generated by using the secret key of the concert host or the concert hall administrator, as the provider of the usage target object, may be added also to the face recognition information printed on the ticket 2 as well as the use permit. In this case, before performing the face recognition of the user 5 (S106), the face recognition part 15 performs verification of the signature added to the face recognition information read by the code reading part 14, by using the public key included in the hole data. When the verification result is failed, the face recognition part 15 does not perform the face recognition of the user 5, and notifies the main control part 19 of the verification result, so that a message indicating that use of the usage target object (viewing of the concert) is rejected is outputted, together with the reason (face recognition failed) of the rejection, to the man-machine interface part 10. By this, it is possible to reject use of a ticket 2 on which illegal face recognition information is printed.

Further, in the above embodiment, the transaction information includes the name of the concert, the name of the concert hall, the event date, and the like. The transaction information, however, may include different information depending on a usage target object. In the case where a usage target object is transportation service provided by a transportation company, the transaction information may include a name of transportation service, a traveling section, and a usage period. Further, depending on a usage target object, the transaction information may include information indicating ticket's effectivity (i.e., indicating an already-used ticket or an unused ticket).

Further, in the above embodiment, a sheet-like medium having the printed two-dimensional code 20 is used as the ticket 2. However, as the ticket 2, it is possible to use electronic data that includes the two-dimensional code 20 and can display the two-dimensional code 20 on a display panel of a mobile terminal such as a smartphone, a tablet PC, or the like.

Further, the above embodiment has been described taking an example in which the use permit and the biometric information is coded and added to the ticket 2. The present invention is not limited to this. In the present invention, it is sufficient that only the coded use permit is added to the ticket 2, and it is not needed to add coded the biometric information to the ticket 2.

In this case, the utilization management device 1 reads the use permit from the code added to the ticket 2, and verifies the signature added to the use permit by using the public key included in the hole data previously stored. In the case where the signature verification is established, the utilization management device 1 acquires the transaction information included in the use permit, and by referring to the transaction information, the utilization management device 1 permits user's use of a usage target object when the usage conditions specified in the transaction information are satisfied.

In this case also, it is possible to prevent falsification of the use permit by verifying the signature of the use permit, and it is possible to verify offline the validity of the provider of the usage target object. Further, since it is judged whether the usage conditions specified in the transaction information included in the use permit are satisfied, it is possible to reject use of the usage target object by the user when the usage conditions are not satisfied even if the validity of the provider of the usage target object is verified.

Further, in the above embodiment, the use permit added as the code to the ticket 2 may have been encrypted with a common key that an issuer of the ticket 2 shares secretly with the concert host or the concert hall administrator as the provider of the usage target object. In this case, the common key is previously included in the hole data stored in the setting information storage part 11 of the utilization management device 1. The utilization management device 1 reads the encrypted use permit from the code added to the ticket 2 to decrypt the use permit by using the common key included in the hole data stored in the setting information storage part 11. By this arrangement, it is possible to prevent more efficiently falsification of the use permit added as the code to the ticket 2.

Further, the above embodiment has been described taking the example where the utilization management system is used for entrance management of the hall in which the concert is held. The present invention, however, is not limited to this. The present invention can be widely applied to utilization management of a usage target object by employing a ticket for authorizing the right to use the usage target object, such as entrance management of a hall or a place in which various types of events such as live show, exhibition, exposition, and the like are held and boarding management of various types of vehicles such as train, airplane, ship, and the like. In these cases, use of a usage target object may be limited by gate closing or locking, and the utilization management device lifts the limit when it judges that usage conditions are satisfied. Further, the usage target object is not limited to service, and may be a movable or immovable property.

REFERENCE SIGNS LIST

1: utilization management device; 2: ticket; 3: simply-prepared passage; 4: staff member; 5: user; 10: man-machine interface part; 11: setting information storage part; 12: camera part; 13: face recognition information acquisition part; 14: code reading part; 15: face recognition part; 16: signature verification part; 17: usage condition judgment part; 18: use permission notification part; 19: main control part; and 20: two-dimensional code.

The invention claimed is:

1. A utilization management device configured to manage a user's use of a usage target object by way of a ticket that includes a code and is issued to the user, the utilization management device comprising:
  a hole data storage device in the form of computer memory, the hole data storage device being configured to store hole data including a first public key required for verifying a use permit and a second public key required for verifying stored biometric information, wherein the use permit and the stored biometric information are associated with the code, and the use permit includes transaction information specifying usage conditions for the user to use the usage target object; and
  a computer processing unit (CPU) comprising:
    a code reading part configured to obtain the use permit and the stored biometric information by reading the code from the ticket;
    a signature verifying part configured to verify a signature added to the stored biometric information obtained by the code reading part by using the second public key and a signature added to the use permit obtained by the code reading part by using the first public key, wherein the first and second public keys are included in the hole data stored in the hole data storage device;
    a biometric information acquiring part configured to acquire biometric information of the user;
    a biometric authentication part configured to perform a biometric authentication of the user when the signature added to the stored biometric information has been verified by the signature verifying part, the biometric authentication being performed by using the biometric information acquired by the biometric information acquiring part and the stored biometric information obtained from the code by the code reading part; and
    a usage condition judging part configured to judge whether the usage conditions specified in the transaction information are satisfied or not when the biometric authentication of the user by the biometric authentication part has been established and the signature added to the use permit has been verified by the signature verifying part, the judgement being performed by referring to the transaction information included in the use permit obtained by the code reading part,
  wherein the utilization management device is configured to receive the hole data from a provider of the usage target object before obtaining the use permit from the ticket.

2. A utilization management device according to claim 1, wherein:
the utilization management device further comprises a use permission notifying part of the CPU; and
the use permission notifying part is configured to output:
a use permission notification when the usage condition judging part judges that the usage conditions are satisfied; and
a use rejection notification when the biometric authentication of the user by the biometric authentication part is failed, when the verification of the signature by the signature verifying part is failed, or when the usage condition judging part judges that the usage conditions are not satisfied.

3. A utilization management device according to claim 1, wherein:
the biometric information is face recognition information;
the utilization management device comprises an image sensor configured to obtain images of a face of the user and the code;
the biometric information acquiring part is configured to acquire the biometric information from the image of the face of the user obtained by the image sensor; and
the code reading part is configured to read the use permit from the image of the code obtained by the image sensor.

4. A utilization management device according to claim 1, wherein,
the utilization management device further comprises a lifting part of the CPU that is configured to lift a restriction on use of the usage target object when the usage condition judging part judges that the usage conditions are satisfied.

5. A utilization management device according to claim 2, wherein:
the biometric information is face recognition information;
the utilization management device further comprises an image sensor configured to obtain images of a face of the user and the code;
the biometric information acquiring part is configured to acquire the biometric information from the image of the face of the user obtained by the image sensor; and
the code reading part is configured to read the use permit from the image of the code obtained by the image sensor.

6. A utilization management device according to claim 1, wherein,
the utilization management device further comprises a lifting part of the CPU that is configured to lift a restriction on use of the usage target object when the usage condition judging part judges that the usage conditions are satisfied.

7. A utilization management device according to claim 2, wherein,
the utilization management device further comprises a lifting part of the CPU that is configured to lift a restriction on use of the usage target object when the usage condition judging part judges that the usage conditions are satisfied.

8. A utilization management device according to claim 3, wherein,
the utilization management device further comprises a lifting part of the CPU that is configured to lift a restriction on use of the usage target object when the usage condition judging part judges that the usage conditions are satisfied.

9. A utilization management device according to claim 5, wherein,
the utilization management device further comprises a lifting part of the CPU that is configured to lift a restriction on use of the usage target object when the usage condition judging part judges that the usage conditions are satisfied.

10. A utilization management device according to claim 4, wherein the usage target object is configured so that use of the usage target object is limited by closing or locking a gate.

11. A utilization management device according to claim 6, wherein the usage target object is configured so that use of the usage target object is limited by closing or locking a gate.

12. A utilization management device according to claim 7, wherein the usage target object is configured so that use of the usage target object is limited by closing or locking a gate.

13. A utilization management device according to claim 8, wherein the usage target object is configured so that use of the usage target object is limited by closing or locking a gate.

14. A utilization management device according to claim 9, wherein the usage target object is configured so that use of the usage target object is limited by closing or locking a gate.

15. A utilization management method for managing use of a usage target object by a user, by way of a ticket issued to the user and a utilization management device, wherein:
a use permit that includes transaction information specifying usage conditions for the user to use the usage target object and stored biometric information of the user, are added as a code to the ticket; and
the utilization management device:
reads the use permit and the stored biometric information from the code added to the ticket held by the user;
verifies a signature added to the stored biometric information read from the code by using a public key provided in advance from a provider of the usage target object;
when the signature added to the stored biometric information has been verified, acquires biometric information from the user and performs a biometric authentication of the user using the acquired biometric information and the stored biometric information read from the code added to the ticket;
verifies a signature added to the use permit read from the code by using the public key provided in advance from a provider of the usage target object; and
when the biometric authentication of the user has been established and the signature added to the use permit has been verified, acquires the transaction information included in the use permit read from the code to judge whether the usage conditions specified in the transaction information are satisfied or not.

16. A computer program product embodying computer readable instructions stored on a non-transitory computer readable medium and configured to cause a computer to function as a utilization management device that manages a user's use of a usage target object by way of a ticket that includes a code and is issued to the user,
wherein the computer is configured to execute the computer readable instructions so as to:
receive hole data from a provider of the usage target object, the hole data including a first public key required for verifying a use permit and a second public key required for verifying stored biometric information, wherein the use permit and the stored biometric information are associated with the code, and the use permit includes transaction information specifying usage conditions for the user to use the usage target object;

store the hole data;

obtain the use permit and the stored biometric information after receiving the hole data from the provider by reading the code from the ticket;

verify a signature added to the stored biometric information by using the second public key required for verifying the stored biometric information included in the stored hole data;

when the signature added to the stored biometric information has been verified, acquire biometric information from the user and perform a biometric authentication of the user by using the biometric information acquired from the user and the stored biometric information;

verify a signature added to the use permit by using the first public key required for verifying the use permit included in the stored hole data; and when the biometric authentication of the user has been established and the signature added to the use permit has been verified, refer to the transaction information included in the use permit to judge whether the usage conditions specified in the transaction information are satisfied or not, wherein the utilization management device is configured to receive the hole data from a provider of the usage target object before obtaining the use permit from the ticket.

* * * * *